Nov. 25, 1958  M. J. LOEHLE  2,861,590
FLOW CONTROL DEVICE

Filed Sept. 20, 1956  2 Sheets-Sheet 1

INVENTOR.
MAX J. LOEHLE
BY *H. F. Manbeck, Jr.*
HIS ATTORNEY

Nov. 25, 1958

M. J. LOEHLE 2,861,590

FLOW CONTROL DEVICE

Filed Sept. 20, 1956

INVENTOR.
MAX J. LOEHLE

BY

HIS ATTORNEY

United States Patent Office 2,861,590
Patented Nov. 25, 1958

2,861,590

FLOW CONTROL DEVICE

Max J. Loehle, Louisville, Ky., assignor to General Electric Company, a corporation of New York Application September 20, 1956, Serial No. 611,067

3 Claims. (Cl. 137—513.7)

My invention relates to devices for controlling the flow through a pipe or other conduit and more particularly to such devices for maintaining a relatively constant flow over a wide range of inlet pressures.

Flow control devices for regulating the flow through a conduit so as to produce a relatively constant output flow regardless of the inlet pressure are used in various types of apparatus. By way of example, these devices, hereinafter referred to simply as flow control devices, are used in drinking fountains in water heating apparatus, and in lavatory and shower bath equipment. Further, they have found wide use in automatic washing machines for controlling the rate of filling of the water containing tub, particularly for preventing splashing or spraying out of the tub when abnormally high inlet pressures occur.

In the copending application of John Bochan, S. N. 611,065 filed on September 20, 1956 concurrently herewith and assigned to the same assignee as the present invention, there is described and claimed a new and improved flow control device in which the flow regulation is effected by means of an apertured control plate and a plurality of resilient balls. This flow control device includes a passageway or chamber through which is passed the flow to be controlled, and the control plate is disposed at the outlet of this passageway. The plate has a main outlet opening and at least one bypass opening therethrough, and a plurality of resilient spheres are disposed in the passageway on the upstream side of the plate in a side-by-side relationship. The spheres are so arranged that they partially cover the main outlet opening through the plate and they cooperate with the main opening to provide a flow controlling action or effect upon changes in the inlet pressure to the passageway. As the inlet pressure increases, the spheres are deformed by it so as to block off progressively the main outlet opening. Thereby the flow through the main outlet is gradually decreased as the flow through the bypass outlet increases, and as a result a relatively constant output flow is maintained over a wide range of inlet pressures.

The present invention relates to and has as its principal object the provision of an improved flow control device of this type which is effective to maintain a particularly constant flow over a wide range of inlet pressures. In carrying out the invention I provide a control plate for the flow control device in which the main aperture or orifice is of a more or less hourglass shape; and I position the resilient balls upstream of the plate so that each ball is primarily associated with one of the opposite sections of the orifice. As a result of this orifice shape and ball arrangement an improved flow characteristic is obtained from the device making it particularly suitable for use in automatic washing machines and other domestic apparatus which may be connected to a variable pressure water supply.

The subject matter which I regard as my invention is particularly pointed out and distinctly claimed in the concluding portion of the specification. My invention, however, both as to organization and method of operation, together with further objects and advantages thereof, may be best understood by reference to the following description taken in conjunction with the accompanying drawings in which:

Figure 1:
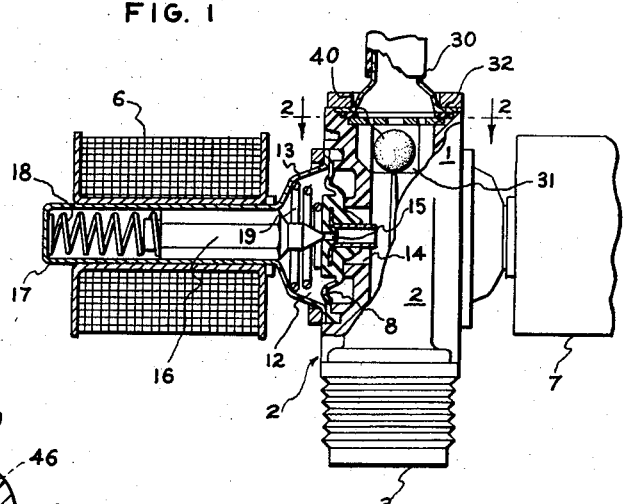
Fig. 1 is a side elevational view showing a flow control device embodying my invention and a combination shut-off and mixing valve incorporated within the same casing, the view being partially broken away and partially in section to show details of both the flow control device and the valve.

Referring now to the drawings I have shown therein a preferred embodiment of my new and improved flow control device 1 as incorporated within the same casing as a combination shut-off and mixing valve 2. I have shown the flow control device so arranged with the valve since this arrangement comprises one convenient way in which they may be used in an automatic washing machine. It will be understood, however, that even though they are incorporated within the same casing, the flow control device and the valve each performs its separate function in the same manner as if they were in completely separate casings. The flow control could be mounted at a point remote from the valve and would perform exactly the same function as it does when incorporated within the same casing as the valve in the manner shown. It will further be understood that my new and improved flow control device is not limited to use with the particular valve structure shown, either in the same casing or at a remote point, since any suitable valve means or conduit may be used to pass the flow to be controlled to my flow control device.

To explain first the manner in which the flow to be controlled is introduced to the flow control device 1, it will be seen that the combination shut-off and mixing valve 2 is adapted to pass water or other liquid from either or both of two inlets 3 and 4 to a mixing chamber 5 which leads to the flow control 1. The flow from the inlet 3 to the mixing chamber is controlled by a solenoid 6 and the flow from the inlet 4 is controlled by a solenoid 7. The two solenoids 6 and 7 specifically control the flow by controlling respectively the operation of two diaphragms 8 and 9 which are mounted within the valve casing or body. These diaphragms are both of the pilot actuated type and are identical in both construction and operation so that for simplicity and ease in description only the operation of the diaphragm 8 will be described in detail.

The inlet liquid from the inlet 3 reaches the diaphragm 8 by means of a longitudinally extending passageway 10 and a cross passageway 11 both formed in the valve casing or body. The diaphragm 8 includes a central or valve portion and an outer flexible portion, and it is mounted within a closed chamber 12 formed between a cap 13 of the solenoid assembly and the left hand side surface of the valve body as viewed in Fig. 1. The central or valve portion of the diaphragm, as shown, is adapted to seat on the outer flange of a passageway 14 leading from the chamber 12 to the mixing chamber 5, and the outer flexible portion of the diaphragm 8 is secured at its outer periphery between the cap 13 and the valve casing. The diaphragm 8 thereby not only divides the chamber 12 into inner and outer parts but also in its normal position prevents passageway 11 from communicating with passage 14.

The diaphragm 8 includes a small bleed hole (not shown) through its outer flexible portion whereby the high pressure liquid in the passageway 11 and the inner portion of the chamber 12 may leak under pressure through the diaphragm into the outer portion of the chamber 12. As a result, provided that no liquid can escape through a central aperture 15 in the diaphragm which is normally closed by a plunger 16, the diaphragm is subjected to a greater force on its outer surface than on its inner surface. The area of the outer surface of the diaphragm exposed to the liquid pressure is greater than the inner surface so exposed, whereby the total force on the outer surface is greater. As a result the central valve portion of the diaphragm is held down tightly against the inlet flange of the passageway 14 to the mixing chamber so as to seal it off.

When, however, it is desired to pass flow from the inlet 3 through the passageway 14 into the mixing chamber, at that time the solenoid 6 is energized. The solenoid controls the plunger 16 which, as shown in Fig. 1, is arranged for longitudinal movement within an outward tubular extension 17 of the cap 13. The inner tapered end of the plunger 16 normally seats in the aperture 15 through the diaphragm 8 so that no leakage can occur therethrough. However as soon as the solenoid 6 is actuated, it pulls the plunger away from the diaphragm and opens the aperture 15. As a result the liquid in the outer portion of chamber 12 immediately begins to leak through the aperture 15, and the aperture being greater than the bleed hole in the diaphragm, the liquid within the outer portion of the chamber 12 escapes at a fast rate into the mixing chamber 5. The pressure on the outer surface of the diaphragm thereby becomes insufficient to hold the diaphragm seated on the inlet flange of the passageway 14 against the pressure on the inner side of the diaphragm, and the diaphragm rises, or more accurately, is forced off the flange. Thereby a direct passageway is opened from the inlet 3 to the mixing chamber 5, and flow passes freely from the inlet 3 to the mixing chamber and the flow control device 1.

This flow continues so long as the solenoid 6 remains energized. When it is desired to shut off the flow, at that time the solenoid 6 is de-energized and the plunger 15 is returned into contact with the diaphragm by the biasing spring 18 disposed behind it. As soon as the plunger 16 closes the aperture 15, the pressure again begins to build up in the outer portion of the chamber 12. The liquid coming through the bleed hole in the diaphragm can no longer escape through the aperture 15 and thus the pressure begins to increase behind the diaphragm. In a short time the total force applied to the outer side of the diaphragm becomes greater than the force applied to the inner side of the diaphragm and thereby the valve portion of the diaphragm is forced to seat against the inlet flange of the passageway 14. This, of course, closes off the flow to the mixing chamber. It will be noted that a spring 19 is disposed between the cap 13 and the valve portion of the diaphragm to aid in this closing action.

As mentioned above, the action of the diaphragm 9 is identical to that of the diaphragm 8 so that no detailed description of it will be given herein. However it will be noted that the diaphragm 9 is disposed within a suitable diaphragm chamber 20, and that passageways 21 and 22 lead from the inlet 4 to the diaphragm chamber 20, specifically to the underside of the diaphragm. Also, it will be seen that the central portion of the diaphragm 9 normally seats on the flanged inlet of a passageway 23 leading from the diaphragm chamber 20 to the mixing chamber 5, thereby to close off the passageway. The diaphragm remains in this closed or seated position so long as the spring biased plunger 24 controlled by the solenoid 7 remains in the illustrated position closing the aperture 25 through the center of the diaphragm. However, when the solenoid 7 is energized so as to pick up the plunger 24, the diaphragm 9 is at that time moved upwardly by the inlet pressure so as to allow free communication between the inlet 4 and the mixing chamber and the flow control device 1.

From the above it will be seen that when either or both of the solenoids 6 and 7 are energized, a flow of liquid is passed through the mixing chamber 5 to the flow control device 1. The flow control 1 is effective to regulate this flow so that a relatively constant flow is discharged from the outlet 30 of the device regardless of the inlet pressure over a wide range thereof. When the illustrated apparatus is incorporated within a washing machine, the filling of the machine is thereby accomplished at a steady rate even though the water pressure varies from one filling to another, whereby splashing or spraying out of the tub is avoided.

The flow control device 1 is shown as mounted at the upper end of the valve 2, and it includes a passageway or chamber 31 which is in direct communication at its inlet end with the mixing chamber 5 of the valve 2. At the other or outlet end of the passageway 31 there is positioned a wall or plate 32 which extends completely across the passageway normal to its flow axis. The plate 32 in other words closes the outlet end of the flow control passageway or chamber. The plate may be mounted in any suitable manner but is shown as having its outer end disposed within an annular recess formed in the casing of the flow control (see Fig. 5). An annular rubber gasket 33 is positioned above the plate to prevent leakage past it and the plate and the gasket are held in position by a flange 34 of the outlet tube 30. The flange 34 and thus the tube 30 as a whole are in turn secured on the casing by an outer clamping plate 35. The clamping plate 35 may be secured to the casing by any suitable means as by bolts or screws (not shown).

In order to discharge the flow from the chamber 31 into the outlet tube 30 the plate 32 includes a main outlet means and a bypass outlet means. The main outlet means comprises a relatively large aperture 36 through the center portion of the plate and the bypass outlet means comprises a pair of smaller apertures 37 and 38 positioned on opposite sides of the main aperture. It is by controlling the flow through the main outlet aperture 36 that the flow control is effective to maintain a relatively constant flow over a wide variation of inlet pressures. Upon an increase in the inlet pressure that is, upon an increase in the pressure in the mixing chamber 5, the flow control is effective to gradually decrease the flow through the main outlet 36 as the flow through the bypass outlets 37 and 38 increases. Thereby a relatively constant output flow is maintained through the outlet tube 30.

Figure 2:
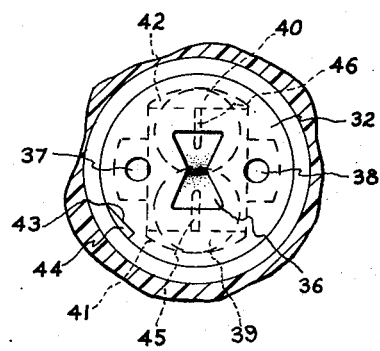
Fig. 2 is a sectional view taken on the line 2—2 of Fig. 1.
Figure 3:
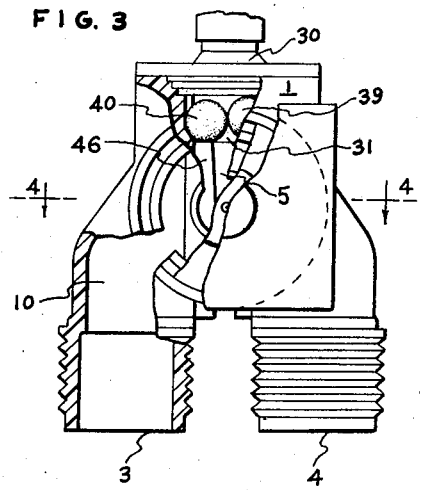
Fig. 3 is a front elevational view of the flow control device and the valve of Fig. 1, also broken away to show details.
Figure 4:
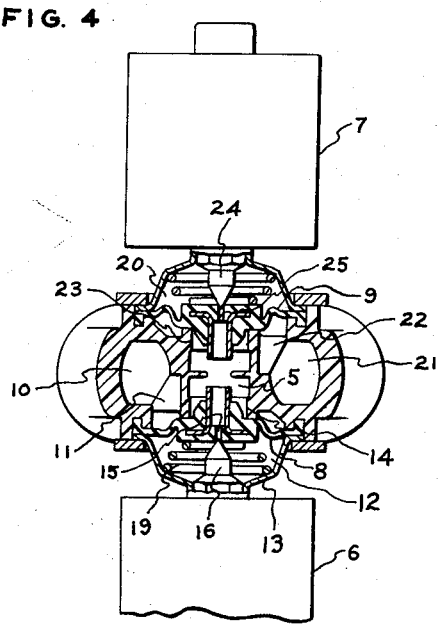
Fig. 4 is a sectional view taken on the line 4—4 of Fig. 3.
Figure 5:
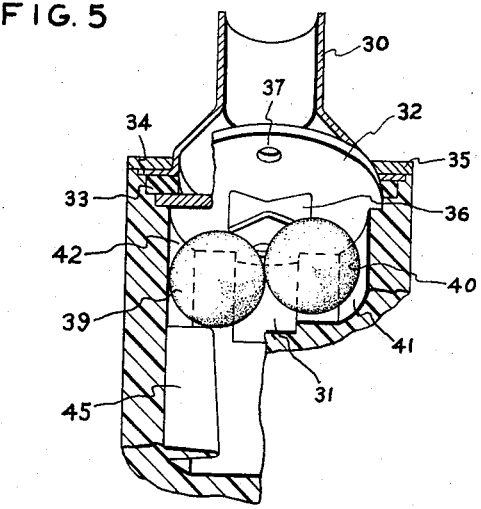
Fig. 5 is an isometric view of the flow control device alone, the view being broken away to show the inner construction thereof.

The shape of the main outlet aperture 36 will be particularly noted since this shape comprises an important aspect of my invention. The aperture 36, as best seen in Figs. 2 and 5, is formed in a generally hourglass shape. That is, it includes a relatively narrow neck with wider sections on each side of the neck. In my preferred embodiment the side sections on each side of the neck are, as shown, of a generally truncated triangular shape. The importance of this hourglass shape of the main aperture and the desirable results obtained will be explained hereinafter.

The flow through the aperture 36 and thus the output characteristics of the flow control as a whole is controlled by means of a pair of resilient compressible spheres 39 and 40 which are disposed within the flow control passageway or chamber 31. The spheres or balls 39 and 40, which may for example be formed of rubber, are disposed on the upstream side of the plate 32 closely adjacent thereto, and they are arranged in a side-by-side relationship. It will be noted that each ball is associated with an opposite side of the aperture 36. In other words each sphere or ball is so held within the passageway 31 that it covers primarily the one section of the aperture 36 but not the other. In the illustrated embodiment this positioning of the balls is effected by means of opposed recesses 41 and 42 provided in the inner wall of the chamber 31. The recesses 41 and 42 enclose a considerable portion of the balls whereby they cannot move sideways off their respective sections of the recess; and since the two balls together are substantially equal to the distance between the opposite ends of the recesses, the balls themselves by their contact prevent each other from moving longitudinally from their respective sections of the recess to the other section. In the illustrated embodiment it will be noted that the combined diameters of the two balls is slightly greater than the width between the outer ends of the recesses 41 and 42. However, it is understood that this is only a matter of tolerances and in some cases the combined width of the balls may be exactly equal to the distance between the outer edges of the recesses or somewhat less than it without altering in any substantial way the operation of the flow control device.

The recesses 41 and 42 in addition to maintaining the balls 39 and 40 over their respective sections of the central recess 36 also serve to keep the balls from covering the bypass apertures 37 and 38. In other words as best seen in Fig. 2, the recesses hold the balls spaced from the bypass apertures 37 and 38 at all times so that the flow through them can never be blocked off by the balls.

To insure that the plate 32 and thereby the apertures 36, 37 and 38 are properly positioned with regard to the recesses 41 and 42, indexing means are preferably provided whereby the plate can be assembled within the chamber 31 in only one angular position. This indexing means in my preferred embodiment comprises a notch 43 (see Fig. 2) cut in the periphery of the plate 32 and a mating protuberance 44 formed on the wall of casing. The plate 32 can be assembled within the chamber 31 only when it is in the illustrated position wherein the notch is fitted over the protuberance, and thus the apertures 36 and 37 and 38 are necessarily disposed correctly relative to the recesses 41 and 42.

Since it is possible that the valve and flow control device may be mounted in a position wherein the flow control lies above the valve, it in fact being shown in such a position, means are therefore provided within the structure for preventing the balls from falling down into the mixing chamber 5. In the illustrated structure this means comprising the vanes 45 and 46 formed on the wall of the mixing chamber. When the balls are in their inoperative position, they rest on these vanes and thereby cannot move downwardly into the mixing chamber. However, it will be understood that any suitable means can be used for retaining the balls within the flow control chamber 31 during the inoperative periods of the device 1.

In the drawing the balls 39 and 40 are shown in their inoperative state, that is, their state when no pressure is applied to the flow control and no flow is passing through it. In this inoperative state the balls partially cover their respective sections of the main aperture 36, this being best seen in Fig. 2. However, they do not block off either section of the aperture completely, there still being communication between both sections and the chamber 31. The bypass apertures 37 and 38 of course are not covered in any way by the balls. When pressure is applied to the chamber 31, the balls 39 and 40 then control the flow to the device 1 by closing off more or less of the main aperture 36 in accordance with the amount of the pressure. As the inlet pressure to the chamber increases, the balls 39 and 40 are squeezed together and compressed down onto the plate 32. The lower portion of each ball is also forced into its respective section of the recess to some extent. The higher the inlet pressure the harder the balls are forced together and flattened down onto the plate and into the recess. As a result the higher the pressure, the more effective the balls become to close off the main outlet 36. In other words, they progressively cover its two sections more and more as the pressure increases until at a very high pressure they are squeezed tightly enough together to essentially close the aperture 36 completely.

As the balls or spheres are compressed together and progressively close off the two sections of the aperture 36, they attenuate or cut-down the flow through the aperture. In other words as the inlet pressure increases, the action of the balls is effective to decrease gradually the flow through the two sections of the main outlet aperture. The bypass apertures 37 and 38, however, since they are not blocked in any way by the balls pass an increasingly greater flow as the pressure increases. The result of all of this is that a relatively constant output flow is maintained in the outlet tube 30 over a wide range of inlet pressures. The more the flow through the two sections of the main aperture 36 is cut down, the more the flow is increased through the bypass apertures 37 and 38, and thereby a steady output flow is maintained.

As a result of the hourglass shape of the center aperture with the two balls being associated respectively with its opposite sections, an improved flow characteristic is provided. In other words steadier output flow is obtained over a wide range of pressures than is obtainable with apertures of different shapes. Further, the shape of the aperture and the manner in which the balls are associated with it cause the balls to remain in position at all times. With each ball fitting into its own section of the aperture to some extent, they do not tend to push each other aside but rather cooperate together efficiently to control the flow. It is of course extremely undesirable for one ball to push the other aside and away from the main aperture, since the one ball may then lodge in the aperture so to close it off completely or be pushed through it.

Figure 6:
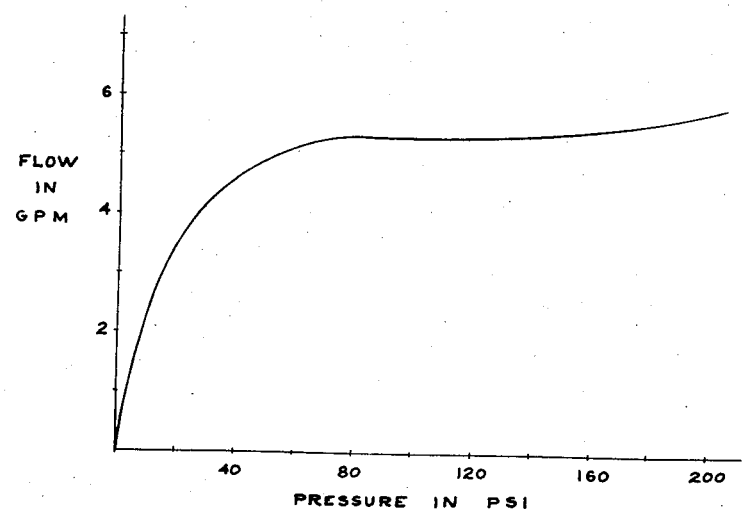
Fig. 6 is a graph showing the results obtained from one particular embodiment of the flow control device.

Referring now to Fig. 6 I have plotted therein in graph form the results obtained from one particular embodiment of my flow control device. The embodiment which gave these results included a control plate, such as the plate 32, in which the main or control aperture was hourglass shape and was approximately 0.11 inch wide at its neck, 0.17 inch wide at its opposite ends and 0.30 inch long between its ends. The balls 39 and 40 positioned behind the respective section of the aperture were formed of rubber and were approximately 0.31 inch in diameter and of about 55 durometer hardness. In the graph the pressures applied at the inlet to the flow control device are plotted along the abscissa in pounds per square inch, and the outlet flow from the device is plotted along the ordinate in gallons per minute. It will be noted that in the wide range of pressures from 40 pounds per square inch to 180 pounds per square inch the outlet flow was maintained in an extremely narrow band between about 4.6 gallons per minute and about 5.5 gallons per minute. In other words over a range of inlet pressures 140 pounds wide, the outlet flow varied only about one gallon per minute from its lowest to its highest value. With such a minor variation of outlet flow over a wide range of inlet pressures, my improved flow control device is ideally suited for use in washing machines, lavatory and shower bath apparatus, drinking fountains, etc.

Summing up, it will thus be seen from the above that my new and improved flow control device has at least two very considerable advantages. Firstly, it produces an extremely flat output characteristic over a wide range of pressures; and secondly, it is so arranged that there is never any tendency for the one ball to push the other ball away from the center orifice in the control plate.

While in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of the invention.

What I claim as new and desire to secure by Letters Patent of the United States is:

1. A flow control device for maintaining a relatively constant rate of fluid flow, comprising a passageway through which the flow to be controlled is passed, a wall closing the outlet end of said passageway, said wall having a main aperture therethrough formed in a plane substantially normal to the flow axis of said passageway and at least one bypass aperture, said main aperture being of a generally hourglass shape necked down at its center to form two sections on opposite sides of said center, and a pair of resilient compressible spheres disposed side-by-side in said passageway on the upstream side of said wall, said spheres being associated respectively with the opposite sections of said aperture with each sphere partially covering its respective section, said spheres being effective to block off said main aperture progressively as they are deformed against said wall by increasing inlet pressure, thereby to maintain a relatively constant flow through said device.

2. A flow control device for maintaining a relatively constant rate of fluid flow, comprising a passageway through which the flow to be controlled is passed, a plate closing the outlet end of said passageway, said plate having a main aperture therein formed in a plane substantially normal to the flow axis of said passageway and at least one bypass aperture, said main aperture being of a generally hourglass shape necked down at its center to form two sections on opposite sides of said center, a pair of resilient compressible spheres disposed side-by-side in said chamber on the upstream side of said plate, said spheres being associated respectively with the opposite sections of said aperture with each sphere partially covering its respective section, said spheres being effective to block off said main aperture progressively as they are deformed against said plate by increasing inlet pressure, thereby to maintain a relatively constant flow, and positioning means for retaining said spheres over their respective sections of said main aperture and spaced from said bypass aperture.

3. A flow control device for maintaining a relatively constant rate of fluid flow, comprising a passageway through which the flow to be controlled is passed, a plate closing the outlet end of said passageway, said plate having a main aperture therein formed in a plane substantially normal to the flow axis of said passageway and a plurality of smaller side apertures, said main aperture being of a generally hourglass shape necked down at its center, with the sections of said aperture on the opposite sides of its neck being of a truncated triangular shape, a pair of resilient compressible balls disposed side-by-side in said passageway on the upstream side of said plate, said balls being associated respectively with the opposite sections of said main aperture with each ball partially covering its respective section, said balls being effective to block off said main aperture progressively as they are deformed against said plate by increasing inlet pressure, and recess means formed in the wall of said passageway for retaining said balls over their respective sections of said main aperture and spaced from said bypass apertures.

References Cited in the file of this patent

UNITED STATES PATENTS

| | | |
|---|---|---|
| 2,291,881 | Coffey | Aug. 4, 1942 |
| 2,497,020 | Singer | Feb. 7, 1950 |